US009043765B2

(12) United States Patent
Ahmed et al.

(10) Patent No.: US 9,043,765 B2
(45) Date of Patent: May 26, 2015

(54) SIMULTANEOUSLY TARGETING MULTIPLE HOMOGENEOUS AND HETEROGENEOUS RUNTIME ENVIRONMENTS (75) Inventors: Haroon Ahmed, Bellevue, WA (US); Sadik Gokhan Caglar, Seattle, WA (US); Fabian O. Winternitz, Sammamish, WA (US); Donald F. Box, Yarrow Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/292,535

(22) Filed: Nov. 9, 2011

(65) Prior Publication Data
US 2013/0117733 A1 May 9, 2013

(51) Int. Cl.
*G06F 9/44* (2006.01)
*G06F 9/45* (2006.01)

(52) U.S. Cl.
CPC ... *G06F 8/30* (2013.01); *G06F 8/47* (2013.01)

(58) Field of Classification Search
None
See application file for complete search history.

(56) References Cited

U.S. PATENT DOCUMENTS

| 6,115,550 | A * | 9/2000 | Hunter et al. | 717/162 |
|---|---|---|---|---|
| 6,158,045 | A * | 12/2000 | You | 717/124 |
| 6,226,776 | B1 * | 5/2001 | Panchul et al. | 716/102 |
| 6,381,737 | B1 * | 4/2002 | Click et al. | 717/136 |
| 6,901,587 | B2 * | 5/2005 | Kramskoy et al. | 717/154 |
| 7,127,707 | B1 * | 10/2006 | Mishra et al. | 717/137 |
| 7,337,428 | B2 | 2/2008 | Kipman et al. | |
| 8,346,897 | B2 * | 1/2013 | Jaroker | 709/220 |
| 8,464,237 | B1 * | 6/2013 | Taylor | 717/165 |
| 2001/0039549 | A1 * | 11/2001 | Eng et al. | 707/205 |
| 2003/0110297 | A1 * | 6/2003 | Tabatabai et al. | 709/246 |
| 2003/0236690 | A1 * | 12/2003 | Johnston-Watt et al. | 705/7 |
| 2005/0049843 | A1 * | 3/2005 | Hewitt et al. | 703/14 |
| 2008/0098207 | A1 * | 4/2008 | Reid et al. | 712/227 |
| 2009/0083219 | A1 * | 3/2009 | Zane et al. | 707/2 |
| 2010/0281461 | A1 * | 11/2010 | Tyler et al. | 717/106 |
| 2011/0191092 | A1 * | 8/2011 | Mizrachi et al. | 703/14 |
| 2012/0030650 | A1 * | 2/2012 | Ravindran et al. | 717/107 |
| 2013/0117733 | A1 * | 5/2013 | Ahmed et al. | 717/140 |
| 2014/0067750 | A1 * | 3/2014 | Ranganathan et al. | 707/602 |

OTHER PUBLICATIONS

"Author, execute and debug homogeneously authored applications on heterogeneous execution environments" by Sunil Bannur and Sameer Bhatt. IP.com Electronic Publication: Mar. 22, 2011. IP.com No. IPCOM000205264D.*

"WebSphere Studio V5 Overview and Architecture" by Carla Sadtler and Kevin Griffith. Redbooks Paper. Copyright IBM Corp. 2003. ibm.com/redbooks.*

(Continued)

*Primary Examiner* — Isaac T Tecklu
*Assistant Examiner* — Hossain Morshed
(74) *Attorney, Agent, or Firm* — Brian Haslem; Mike Allen; Micky Minhas (57) ABSTRACT

A single software project in an integrated development environment (IDE) may be built for multiple target environments in a single build episode. Multiple different output artifacts may be generated by the build process for each of the target environments. The output artifacts are then deployed to the target environments, which may be homogeneous or heterogeneous environments. The same source project may be used to generate multiple output artifacts for the same target environment.

18 Claims, 5 Drawing Sheets

(56) References Cited

OTHER PUBLICATIONS

GNU Makefile. Author: GNU organization. Jun. 5, 2009. Located at http://www.gnu.org/software/make/manual/make.html.*

Visual Studio 2010. Author: Microsoft. Published in 2010. Located at http://msdn.microsoft.com/en-us/library/vstudio/zekwfyz4(v=vs.100).aspx.*

Building C/C++ Projects—Author: IBM. 2004. Locate at http://publib.boulder.ibm.com/infocenter/rsahelp/v7r0m0/topic/org.eclipse.cdt.doc.user or http://publib.boulder.ibm.com/infocenter/rsahelp/v7r0m0/index.jsp?topic=/org.eclipse.cdt.doc.user/concepts/cdt_c_build_ove.rht.*

C/C++ Users Guide. Author: IBM. 2010. Located at http://pic.dhe.ibm.com/infocenter/zos/v1r12/topic/com.ibm.zos.r12.cbcux01/targcop.htm.*

GNU-Make located at http://www.gnu.org/software/make/manual/make.html, 2010.*

GNU-Make-Parallel located at https://www.gnu.org/software/make/manual/html_node/Parallel.html, 2010.*

Microsoft Visual Studio 2010 located at http://msdn.microsoft.com/en-us/library/vstudio/zekwfyz4(v=vs.100).aspx, 2010.*

C/C++ User's Guide from IBM located at http://pic.dhe.ibm.com/infocenter/zos/v1r12/topic/com.ibm.zos.r12.cbcux01/targcop.htm, 2004.*

GNU-Make located at htt.Q://www.gnu.org/softwareimakeimanuallmake.html, 2009.*

GNU-Make-Parallellocated at httgs://www.gnu.org/software/make/manual/htmlnode/Parallel.html, 2010.*

Microsoft Visual Studio 2010 (hereinafter MS-Visual-Studio-201 0) located at httg:limsdn.microsoftcom/en-usilibraryivstudio/zekwfyz4(v::::vs.1 OOj.asQx, 2010.*

Charles University in Prague, "Connector Generator (ConGen)," downloaded from: http://sofa.ow2.org/congen/index.pdf on Nov. 11, 2011, 2006-2011, (3 pages).

Openmake Software, "OpenMake Meister 7.3—Getting Started Guide," downloaded from: http://www.openwavesoftware.com/MeisterGettingStartedGuide.pdf on Nov. 11, 2011, 2009, (30 pages).

Birk, Peter et al., "Enterprise Build Solutions with Build Forge and Rational Team Concert 3.0," downloaded from: https://jazz.net/library/article/607 on Nov. 11, 2011, Nov. 11, 2010, (52 pages).

* cited by examiner

SIMULTANEOUSLY TARGETING MULTIPLE HOMOGENEOUS AND HETEROGENEOUS RUNTIME ENVIRONMENTS

BACKGROUND

An integrated development environment (IDE) provides a set of integrated tools for developing software. The tools are generally run from a single user interface or shell and typically include a text editor, a compiler, and a debugger. Other tools, such as build automation tools and interpreters may be included in the IDE. The IDE may support multiple programming languages and source code scripts, such as C++, C#, VISUAL BASIC®, SQL, and the like. The IDE interface provides users with the same look and feel for the different programming languages.

An IDE contains zero or one solution, and each solution contains zero or more projects. A project contains zero or more source code artifacts and other supporting files. Both a project and a solution also contain configurations to facilitate its various services such as build, publish etc. Build service typically invokes a compiler. All or a subset of source code artifacts and configurations are passed to the compiler. The configuration typically instructs compiler to target a particular runtime environment and to produce a corresponding output artifact.

The compiler is not part of the IDE, but is an independent component that can be invoked from the IDE or from outside of IDE for example through the command line or WINDOWS POWERSHELL®.

Most IDEs or project systems offer configuration options where a single configuration comprises of a number of settings, including the specification of a given target environment to build against. Only one configuration or set of settings can be active at a given time, which allows the user to target only the selected runtime environment.

To target one runtime environment using multiple compilers an IDE uses different projects or invoke separate build episodes with different configurations. Similarly, to target different runtime environments, whether those environments are homogeneous and heterogeneous, the IDE uses different projects or invoke separate build episodes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The user experience disclosed herein allows users to explicitly switch configurations and to target more than one runtime environment during a single build episode. An integrated development environment (IDE) according to one embodiment allows users to build a selected source code project against multiple target environments in a single compile or build episode.

An IDE according to other embodiments allows users to build and validate a given source code project against a selected runtime environment using different compilers. The IDE may create multiple output artifacts using different compilers that are each targeting the same selected runtime environment. For example, each compiler may be optimized in different ways. It will be understood that the term compiler as used herein includes build engines, interpreters, and validation engines.

The compilers provided in the IDE output separate artifacts corresponding to different selected runtime environments. The target runtime environments may be homogeneous or heterogeneous.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
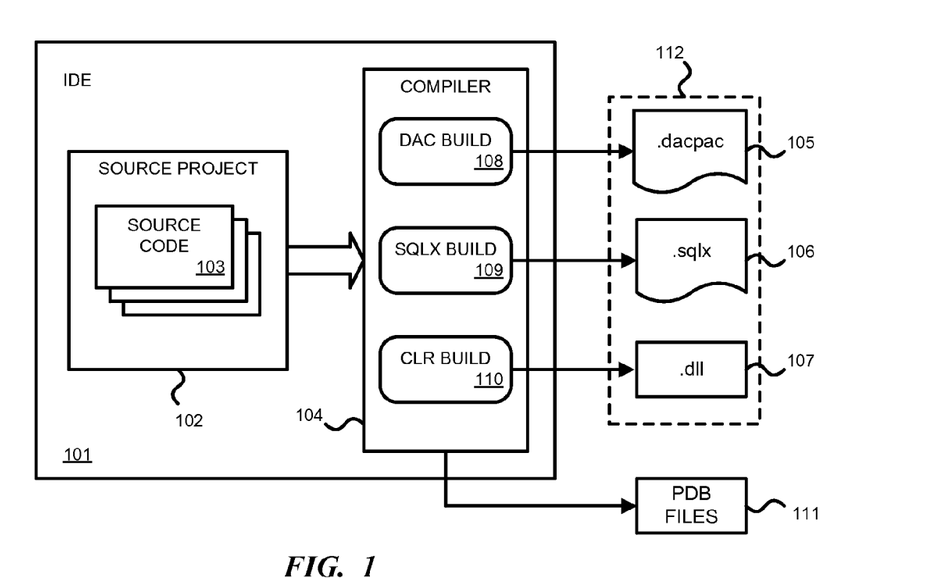
FIG. 1 is a block diagram of an integrated development environment according to one embodiment.

FIG. 1 is a block diagram of an integrated development environment (IDE) 101 according to one embodiment. Users create one or more source projects 102 on IDE 101. The source projects 102 contain one or more source code files 103 and settings to perform global tasks such as build, debug, deploy, and the like. Examples of source projects include, for example, a database project, a C# console application, an ASP.NET MVC project, etc. Source code files 103 are written in one or more selected programming languages. Source code files 103 may include, for example, C#, C++, Transact-SQL (T-SQL), VISUAL BASIC® (VB), or other scripts.

Compiler 104 receives input artifacts, such as source code files 103 and configuration data, and generates multiple output artifacts 105-107. Each of the output artifacts 105-107 is targeted to a particular runtime environment. Compiler 104 comprises a plurality of dedicated build engines or compilers 108-110, which are each associated with a different runtime environment. Dedicated compilers 108-110 operate in parallel on the same input artifacts during one build episode.

The primary output artifacts 105-107 are the main compiled outputs of a build process over a project. Examples of output artifacts 105-107 include, for example, DLL, EXE, SQLX (SQL Embedded in XML), DACPAC (Data-tier Application Component Packages), etc. A secondary output artifact is a supporting artifact to the primary output artifact. For example, the secondary output artifacts may include program database (PDB) files 111 that hold debugging and project state information to assist debugging tasks.

The output artifacts are built in one build episode. Two or more compilers may run in parallel or simultaneously during the build episode. Alternatively, the order in which the compilers run during the build episode may be determined by build dependencies. For example, one compiler may use the output of another compiler and, therefore, must run sequentially during the build episode.

The output artifacts 105-107 of source code project 102 are deployed and run on target runtime environments. Examples of the target runtime environments include, for example, Common Language Runtime (CLR), SQL Server, Java Runtime Environment (JRE), etc. Deployment is an act of installing and enabling an output artifact to a runtime environment. The output artifact 105-107 is usually a build output artifact, but may also be in any other appropriate form for the target environment. Each output artifact 105-107 may be individually deployed on the appropriate runtime.

In one embodiment, the output artifacts may be wrapped together in one envelope. For example, output artifacts 105-107 may be packaged into one file 112, such as a ZIP file. To simplify deployment, the output artifacts may be deployed in the single packaged file 112 to different runtimes. Each runtime may then extract the appropriate artifact to execute on the runtime.

Figure 2:
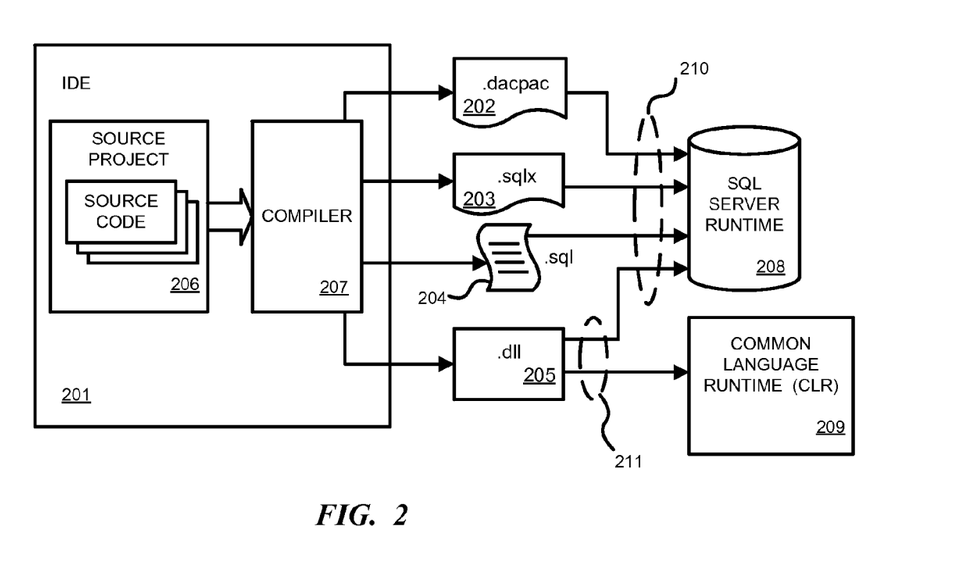
FIG. 2 illustrates an IDE according to one embodiment in which output artifacts are generated for both homogeneous and heterogeneous runtime environments.

FIG. 2 illustrates an IDE 201 according to one embodiment in which output artifacts 202-205 are generated for both homogeneous and heterogeneous runtime environments. Source project 206 is provided to compiler 207, which generates a number of different output artifacts 202-205 as selected by the user. Each output artifact 202-205 may be generated by a different compiler, interpreter or build engine in compiler 207.

DACPAC artifact 202, SQLX artifact 203, and SQL artifact 204 are built to run on SQL server runtime 208. DLL artifact 205 is built to run on both SQL server runtime 208 and on common language runtime (CLR) 209. DACPAC artifact 202, SQLX artifact 203, SQL artifact 204, and DLL artifact 205 are built to run in a homogeneous target environment. Homogeneous environments share same fundamental runtime characteristics. For example, SQL server instances of the same version in similar or different operational states are homogeneous runtimes. Different instances of the same version of an environment, such as SQL server, in different SKU are also homogeneous environments. DACPAC 202, SQLX 203, SQL 204, and DLL 205 are deployed (210) to a homogeneous environment 208.

IDE 201 and compiler 207 also create output artifacts for heterogeneous target environments that do not share the same fundamental runtime characteristics. For example, CLR 209 and SQL server 208 do not share the same runtime characteristics. Output artifacts 202-204 run on SQL server environment 208 and DLL 205 may be run on heterogeneous CLR environment 209. DLL 205 may be deployed (211) to heterogeneous environments 208, 209.

Figure 3:
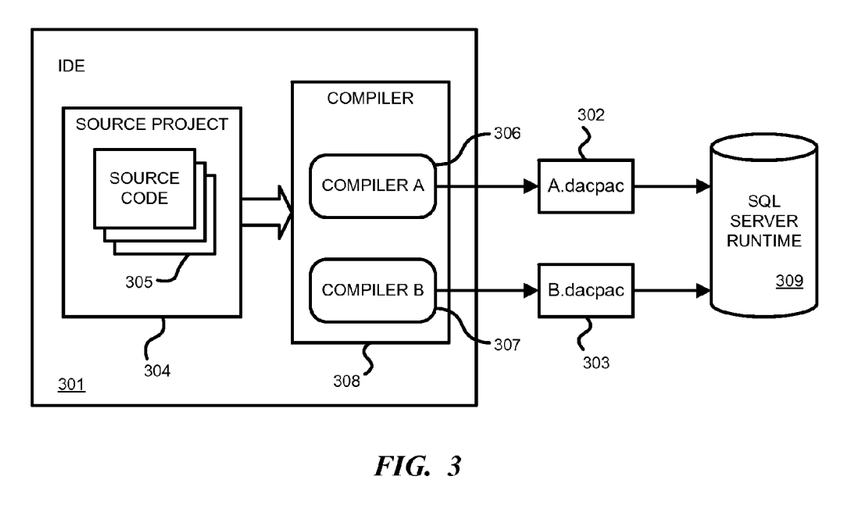
FIG. 3 is a block diagram illustrating another embodiment of an IDE that generates different output artifacts of the same type.

FIG. 3 is a block diagram illustrating another embodiment of an IDE 301 that generates different output artifacts 302, 303 of the same type. A user may create a source project 304 having source code scripts 305 in any programming language. The user may then select different compilers 306, 307 to compile the source code 305. The compilers 306, 307 generate the same type of output artifact 302, 303, but do not create identical outputs. For example, compiler A 306 may be optimized in a different way than compiler B 307. As a result, the output file A.dacpac 302 from compiler A 306 has different code from the output file B.dacpac 303 from compiler B 307.

Compiler 308 compiles the output artifacts 302, 303 in the same build episode. Both output files 302, 303 may be deployed to the same runtime environment, such as SQL server runtime 309.

Figure 4:
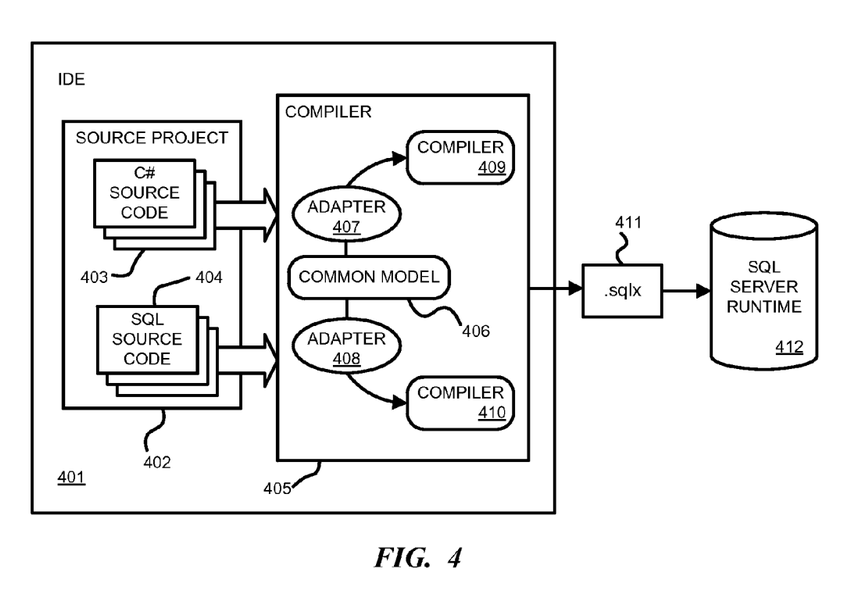
FIG. 4 is a block diagram illustrating an IDE that builds an output artifact from two or more different types of source code.

FIG. 4 is a block diagram illustrating an IDE 401 that builds an output artifact from two or more different types of source code that are within a single project file 402. A user may create a source project having two or more sets of source code 403, 404 written in different programming languages. For example, source code 403 may be written in C# and source code 404 written in SQL. Both parts of the source code 403, 404 for project 402 may be provided to compiler 405.

Compiler 405 extracts data from the source code files 403, 404 to create a common model 406. Embodiments of a system for creating the common model are disclosed, for example, in pending U.S. patent application Ser. No. 13/019,311, filed on Feb. 2, 2011, and titled "Support for Heterogeneous Database Artifacts in a Single Project," the disclosure of which is hereby incorporated by reference herein in its entirety. Adapters 407, 408 are associated with a particular type of compiler, such as C# compiler 409 and SQL compiler 410. Adapters 407, 408 extract components from the common model 406 and translate them for the compilers 409, 410. Compilers 409, 410 build subparts or subsets of the output artifact 411 for target environment 412. Compiler 405 combines the subparts and generates output artifact 411. The combined output artifact 411 may then be deployed to CLR 412.

Embodiments of the integrated development environment disclosed herein allow users to see multiple supported environments and to target one or more of the environments simultaneously. Projects may be built against both homogeneous as well as heterogeneous environments. In other embodiments, the same target runtime may be selected using separate compilers that output different artifacts intended for different deployment engines.

The user opts-in to the desired environments by selecting different compilers. In one embodiment, this selection is performed via a graphical user interface (GUI) for the IDE. Alternatively, the desired environments may be selected or designated by directly editing a project configuration file that is submitted by a command line interface.

Once the user selects the desired environments, the IDE targets those different runtime environments for the subsequent global operations such as source code editing, project build, etc. When the source code is ready for build, the system triggers appropriate compilers to compile the source code as per the given configuration settings. The compilers may optionally operate in parallel to create the output artifacts in a single build episode. If the build either fails, then validation errors from the compilers are provided to the user. In a successful build, the system produces output artifacts. The output artifacts may then be deployed to the target runtime environments via corresponding deployment engines.

The various compilers may produce one primary and multiple optional supporting artifacts.

Embodiments of the project build system provide the ability to target more than one environment from one project at the same time in a single configuration. In other embodiments, the system has the ability to target homogeneous and/or heterogeneous target environments from one project at the same time through different compilers. The system has the ability to output multiple homogeneous and heterogeneous artifacts from a single build episode.

Figure 5:
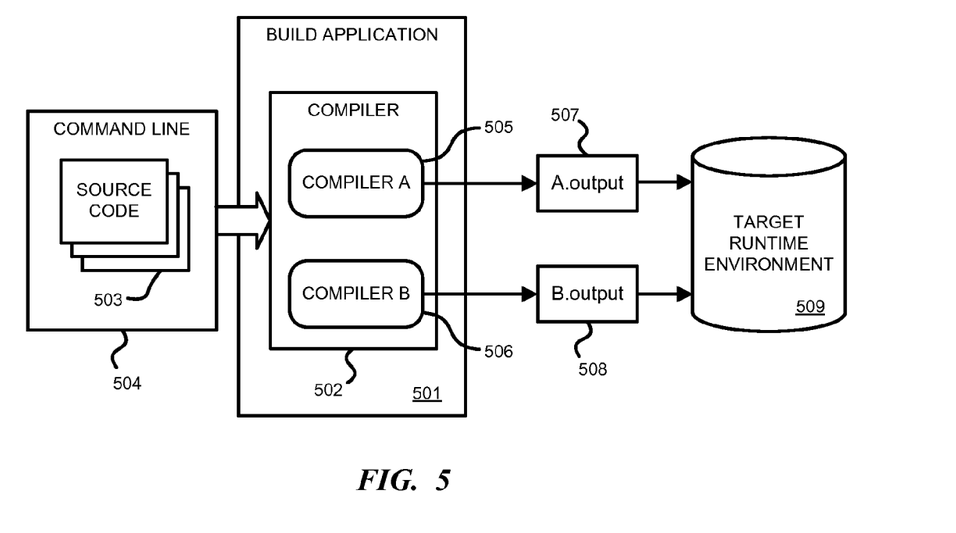
FIG. 5 is a block diagram illustrating invocation of a multiple compiler build application using a command-line according to one embodiment.

FIG. 5 is a block diagram illustrating invocation of a multiple compiler build application using a command-line according to one embodiment. The multiple compiler build application 501 includes a compiler component 502 for compiling source code 503. The source code 503 may be provided to the compiler outside the IDE context. For example, a command-line interface 504 may be used to input the source code 503 to a build application 501. The build application 501 sets up a build episode for the source code 503 on compiler component 502 and designates specific compilers 505, 506 that should be used to build the output artifacts 507, 508. The specific compilers 505, 506 are selected based upon the desired format of output artifacts 507, 508, which may be designated using command line interface 504, for example. Output artifacts 507, 508 are adapted to run in the target runtime environment 509.

Figure 6:
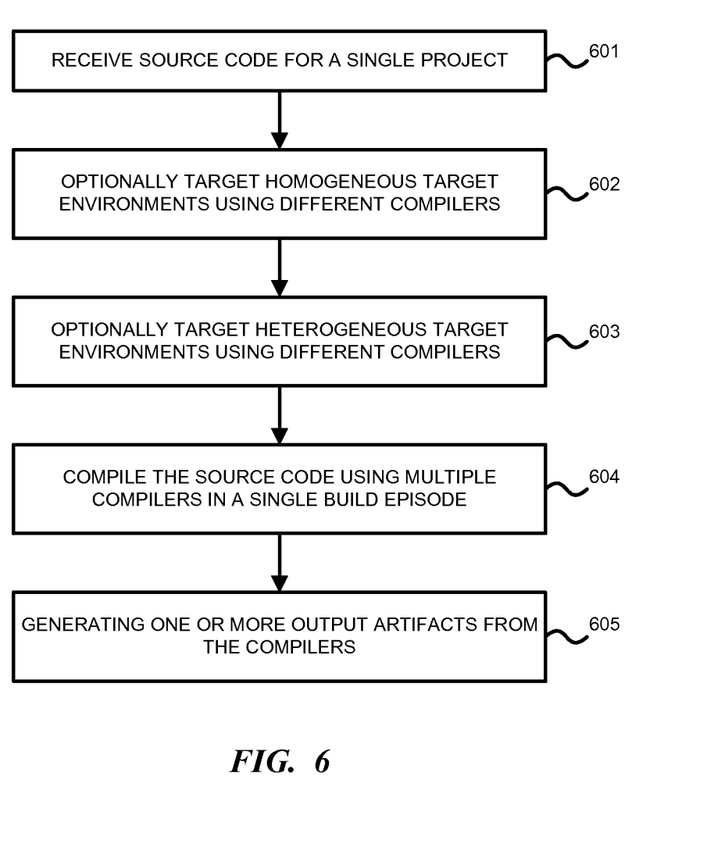
FIG. 6 is a flowchart illustrating a method or process for generating output artifacts from a source project according to one embodiment.

FIG. 6 is a flowchart illustrating a method or process for generating output artifacts from a source project according to one embodiment. In step 601, source code is received for a single project. The source code may be written in any programming language. In step 602, homogeneous target environments are optionally targeted from the source code at the same time using different compilers. In step 603, heterogeneous target environments are optionally targeted from the source code at the same time using different compilers. Steps 602 and 603 allow a user to target two or more runtime environments from the source code at the same time in a single configuration.

In step 604, the source code using multiple compilers in a single build episode. In step 605, one or more output artifacts are generated from the compilers. The output artifacts from the single build episode may be a plurality of homogeneous and/or heterogeneous artifacts depending upon the target environments selected in steps 602 and 603.

It will be understood that steps 601-605 of the process illustrated in FIG. 6 may be executed simultaneously and/or sequentially. It will be further understood that each step may be performed in any order and may be performed once or repetitiously.

Figure 7:
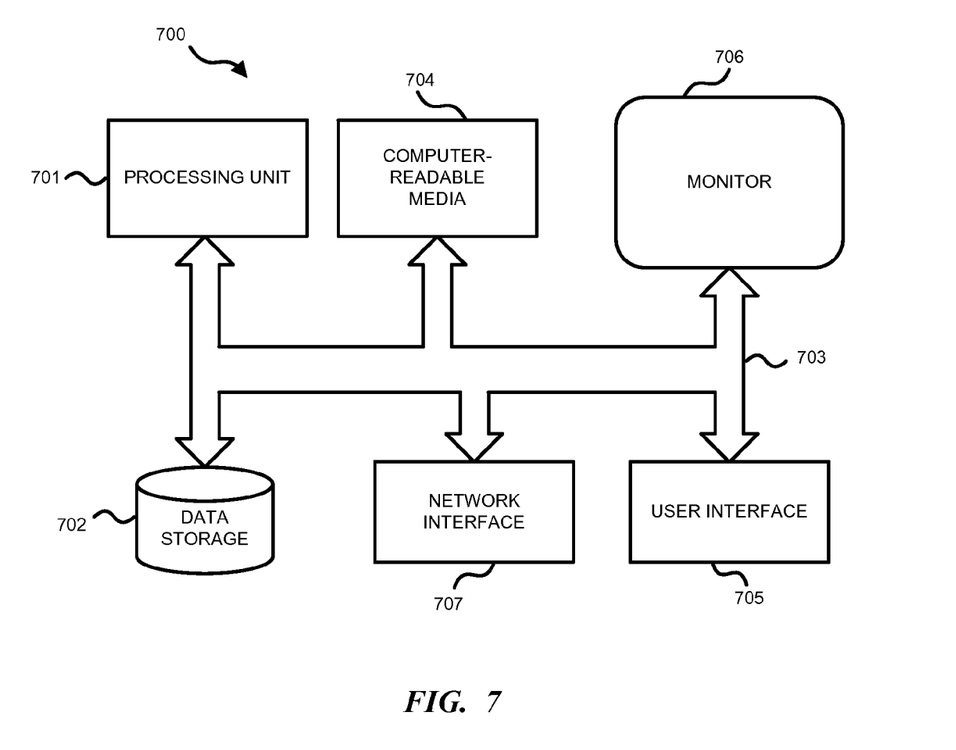
FIG. 7 illustrates an example of a suitable computing and networking environment according to one embodiment.

FIG. 7 illustrates an example of a suitable computing and networking environment 700 on which the examples of FIGS. 1-6 may be implemented. The computing system environment 700 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments, or other hardware that includes any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 7, an exemplary system for implementing various aspects of the invention may include a general purpose computing device in the form of a computer 700. Components may include, but are not limited to, processing unit 701, data storage 702, such as a system memory, and system bus 703 that couples various system components including the data storage 702 to the processing unit 701. The system bus 703 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 700 typically includes a variety of computer-readable media 704.

Computer-readable media 704 may be any available media that can be accessed by the computer 701 and includes both volatile and nonvolatile media, and removable and non-removable media, but excludes propagated signals. By way of example, and not limitation, computer-readable media 704 may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above, excluding propagated signals, may also be included within the scope of computer-readable media. Computer-readable media may be embodied as a computer program product, such as software stored on computer storage media.

The data storage or system memory 702 includes computer storage media in the form of volatile and/or nonvolatile memory such as read only memory (ROM) and random access memory (RAM). A basic input/output system (BIOS), containing the basic routines that help to transfer information between elements within computer 700, such as during start-up, is typically stored in ROM. RAM typically contains data and/or program modules that are immediately accessible to and/or presently being operated on by processing unit 701. By way of example, and not limitation, data storage 702 holds an operating system, application programs, and other program modules and program data.

Data storage 702 may also include other removable/non-removable, volatile/nonvolatile computer storage media. By way of example only, data storage 702 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 7, provide storage of computer-readable instructions, data structures, program modules and other data for the computer 700.

A user may enter commands and information through a user interface 705 or other input devices such as a tablet, electronic digitizer, a microphone, keyboard, and/or pointing device, commonly referred to as mouse, trackball or touch pad. Other input devices may include a joystick, game pad, satellite dish, scanner, or the like. These and other input devices are often connected to the processing unit 701 through a user input interface 705 that is coupled to the system bus 703, but may be connected by other interface and bus structures, such as a parallel port, game port or a universal serial bus (USB). A monitor 706 or other type of display device is also connected to the system bus 703 via an interface, such as a video interface. The monitor 706 may also be integrated with a touch-screen panel or the like. Note that the monitor and/or touch screen panel can be physically coupled to a housing in which the computing device 700 is incorporated, such as in a tablet-type personal computer. In addition, computers such as the computing device 700 may also include other peripheral output devices such as speakers and printer, which may be connected through an output peripheral interface or the like.

The computer 700 may operate in a networked environment using logical connections 707 to one or more remote computers, such as a remote computer. The remote computer may be a personal computer, a server, a router, a network PC, a peer device or other common network node, and typically includes many or all of the elements described above relative to the computer 700. The logical connections depicted in FIG. 7 include one or more local area networks (LAN) and one or more wide area networks (WAN), but may also include other networks. Such networking environments are commonplace in offices, enterprise-wide computer networks, intranets and the Internet.

When used in a LAN networking environment, the computer 700 may be connected to a LAN through a network interface or adapter 707. When used in a WAN networking environment, the computer 700 typically includes a modem or other means for establishing communications over the WAN, such as the Internet. The modem, which may be internal or external, may be connected to the system bus 703 via the network interface 707 or other appropriate mechanism. A wireless networking component such as comprising an interface and antenna may be coupled through a suitable device such as an access point or peer computer to a WAN or LAN. In a networked environment, program modules depicted relative to the computer 700, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving source code for a single project;
compiling the source code using multiple compilers simultaneously in a single build episode, wherein multiple adapters are configured to extract components from a common model during the single build episode, wherein each of the multiple adapters is configured to translate one or more components for each corresponding one of the multiple compilers during the single build episode, and wherein two or more output artifacts resulting from the single build episode are associated with different runtime environments; and
packaging the two or more output artifacts into a single file.

2. The method of claim 1, further comprising:
targeting two or more heterogeneous target environments from the source code at the same time using different compilers.

3. The method of claim 2, further comprising:
outputting a plurality of heterogeneous artifacts from the single build episode.

4. The method of claim 1, further comprising:
generating a plurality of different output artifacts of varying deployment behavior from the plurality of different compilers.

5. The method of claim 1, further comprising:
invoking multiple validation engines running in parallel with the single build episode.

6. The method of claim 1, further comprising:
compiling a first subset of the source code in a first compiler;
compiling a second subset of the source code in a second compiler; and
combining a compiled first output and a compiled second output into one output artifact.

7. The method of claim 1, further comprising:
displaying multiple heterogeneous runtime environments to a user; and
receiving a user selection of one or more of the multiple heterogeneous runtime environments to be targeted by the compilers.

8. The method of claim 1, further comprising:
receiving a user selection identifying multiple targeted homogeneous and heterogeneous runtime environments for the compilers.

9. A computer system, comprising:
a processor;
a memory coupled to the processor, the memory having program instructions stored thereon that, upon execution by the processor, cause the computer system to:
receive source code for a single project;
compile the source code using multiple compilers simultaneously in a single build episode, wherein multiple adapters are configured to extract components from a common model during the single build episode, wherein each of the multiple adapters is configured to translate one or more components for each corresponding one of the multiple compilers during the single build episode, and wherein two or more output artifacts resulting from the single build episode are associated with different runtime environments; and
invoke multiple validation engines running in parallel with the single build episode.

10. The computer system of claim 9, wherein the program instructions, upon execution by the processor, further cause the computer system to:

target two or more runtime environments from the source code at the same time in a single configuration.

11. The computer system of claim 9, wherein the program instructions, upon execution by the processor, further cause the computer system to:
target a combination of heterogeneous and homogeneous target environments from the source code at the same time using different compilers.

12. The computer system of claim 9, wherein the program instructions, upon execution by the processor, further cause the computer system to:
output a combination of homogeneous and heterogeneous artifacts from the single build episode.

13. The computer system of claim 9, wherein the program instructions, upon execution by the processor, further cause the computer system to:
generate a plurality of different output artifacts of varying deployment behavior from the plurality of different compilers.

14. The computer system of claim 9, wherein the program instructions, upon execution by the processor, further cause the computer system to:
compile a first subset of the source code in a first compiler;
compile a second subset of the source code in a second compiler; and
combine a compiled first output and a compiled second output into one output artifact.

15. The computer system of claim 9, wherein the program instructions, upon execution by the processor, further the computer system to:
display multiple heterogeneous runtime environments to a user via a user interface; and
receive a user selection of one or more of the multiple heterogeneous runtime environments to be targeted by the compilers.

16. The computer system of claim 9, wherein the program instructions, upon execution by the processor, further cause the computer system to:
receive a user selection identifying multiple targeted homogeneous and heterogeneous runtime environments for the compilers.

17. A computer program product comprising one or more computer-readable storage media having stored thereon computer-executable instructions that, upon execution by one or more processors of a computing system, cause the computing system to:
receive source code for a single project;
compile the source code using multiple compilers simultaneously in a single build episode, wherein multiple adapters are configured to extract components from a common model during the single build episode, wherein each of the multiple adapters is configured to translate one or more components for each corresponding one of the multiple compilers during the single build episode, and wherein two or more output artifacts resulting from the single build episode are associated with different runtime environments; and
invoke multiple validation engines running in parallel with the single build episode.

18. The computer program product of claim 17, wherein the computer-executable instructions, upon execution by the one or more processors, further cause the computer system to:
target a combination of heterogeneous and homogeneous target environments from the source code at the same time using different compilers.

* * * * *